(12) United States Patent
Rodriguez et al.

(10) Patent No.: US 12,183,084 B2
(45) Date of Patent: Dec. 31, 2024

(54) METHOD AND SYSTEM FOR VEHICLE AUTHENTICATION

(71) Applicant: FlashParking, Inc., Austin, TX (US)

(72) Inventors: Juan Rodriguez, Austin, TX (US); Hunter Dunbar, Austin, TX (US); Ranjith Parakkal, Bengaluru (IN); Sankaranarayanan Parameswaran, Bengaluru (IN); Dossan George, Thrissur (IN); Bhaskar C, Bengaluru (IN); Deval Shah, Ahmedabad (IN); Naman Mishra, Kolkata (IN)

(73) Assignee: FlashParking, Inc., Austin, TX (US)

( * ) Notice: Subject to any disclaimer, the term of this patent is extended or adjusted under 35 U.S.C. 154(b) by 8 days.

(21) Appl. No.: 17/691,983

(22) Filed: Mar. 10, 2022

(65) Prior Publication Data

US 2022/0292836 A1 Sep. 15, 2022

Related U.S. Application Data

(60) Provisional application No. 63/159,268, filed on Mar. 10, 2021.

(51) Int. Cl.
| | | |
|---|---|---|
| G06V 20/54 | (2022.01) |
| G06V 10/776 | (2022.01) |
| G06V 10/94 | (2022.01) |
| G06V 20/62 | (2022.01) |
| G08G 1/04 | (2006.01) |

(52) U.S. Cl.
CPC ............ *G06V 20/54* (2022.01); *G06V 10/776* (2022.01); *G06V 10/95* (2022.01); *G06V 20/625* (2022.01); *G08G 1/04* (2013.01)

(58) Field of Classification Search
CPC .... G06V 20/54; G06V 20/625; G06V 10/776; G06V 10/95; G08G 1/04; G08G 1/146; G08G 1/149; G08G 1/168
See application file for complete search history.

(56) References Cited

U.S. PATENT DOCUMENTS

| | | | |
|---|---|---|---|
| 2017/0330460 A1* | 11/2017 | Massey | G06Q 10/10 |
| 2020/0219390 A1* | 7/2020 | Lyles | G07B 15/02 |
| 2021/0181331 A1* | 6/2021 | Zelenskiy | G01S 13/72 |

FOREIGN PATENT DOCUMENTS

| | | | | |
|---|---|---|---|---|
| CN | 103700280 A | * | 4/2014 | |
| CN | 205038675 U | * | 2/2016 | |
| CN | 106251416 A | * | 12/2016 | |
| CN | 106981103 A | * | 7/2017 | |
| CN | 107526845 A | * | 12/2017 | G06F 17/30241 |
| CN | 108460847 A | * | 8/2018 | G06K 9/00825 |

(Continued)

OTHER PUBLICATIONS

CN111063046 Translation (Year: 2020).*
CN 108460847 translation (Year: 2018).*

*Primary Examiner* — Carol Wang
(74) *Attorney, Agent, or Firm* — Dubois, Bryant & Campbell, LLP; William D. Wiese (57) ABSTRACT

A system and method for identification and authentication of vehicles using imaging to develop a vehicle signature based off of both license plate recognition and identification of distinct features of the vehicle. The system may cross-reference the vehicle signature against databases of known vehicle signatures to authenticate the vehicle and to determine whether or not the vehicle is on a whitelist.

12 Claims, 5 Drawing Sheets

(56) References Cited

FOREIGN PATENT DOCUMENTS

| | | | | |
|---|---|---|---|---|
| CN | 110349411 | A | * 10/2019 | ............. G07B 15/02 |
| CN | 111063046 | A | * 4/2020 | |
| CN | 111178291 | A | * 5/2020 | ......... G06K 9/00785 |
| KR | 100838277 | B1 | * 6/2008 | |
| TW | I706342 | B | * 10/2020 | |
| WO | WO-2020211691 | A1 | * 10/2020 | |

* cited by examiner

METHOD AND SYSTEM FOR VEHICLE AUTHENTICATION

PRIORITY STATEMENT UNDER 35 U.S.C. § 119 & 37 C.F.R. § 1.78

This non-provisional application claims priority based upon prior U.S. Provisional Patent Application Ser. No. 63/159,268, filed Mar. 10, 2021, in the names of Juan Rodriguez, Hunter Dunbar, Ranjith Parakkal, Sankaranarayanan Parameswaran, Dossan George, Bhaskar C, Deval Shah, and Naman Mishra entitled "METHOD AND SYSTEM FOR VEHICLE AUTHENTICATION" the disclosures of which are incorporated herein in their entirety by reference as if fully set forth herein.

FIELD OF THE INVENTION

The present invention relates to a system and apparatus for performing vehicle identification for authentication, followed by automated billing in parking lots.

BACKGROUND OF THE INVENTION

A variety of concerns, including health (contactless parking) and speed of operation necessitate seamless touch-free authentication of vehicles in parking lots. A variety of methods have been used in this regard, each with their own benefits and drawbacks. Some methods like License Plate Recognition ("LPR") involve the usage of sensors and imaging for vehicle identification. LPR requires said sensors/imaging to capture license plate information (often through the use of optical character recognition ("OCR")) which may then be compared against a database containing license plate information associated with other vehicle information in order to positively determine the vehicle with which the license plate information is associated. This method satisfies constraints of quick response rate; however, there are obvious drawbacks resulting from issues ranging from occlusion (e.g., cycle stand fitted on car) to readability of the plates. Other methods like quick response ("QR") code scanning are also popular. Such methods enjoy high accuracy but suffer from slow response.

Another important consideration in parking lots is the ability to operate without the necessity of "gates" or boom-barriers. This system would make for seamless entry using only secondary methods of interaction to intimate the users about billing (for e.g., through emails or messaging services). A robust and highly accurate visual system is needed in such cases to accomplish one or more of the following:
1. detection and identification of vehicles on both entry and exit of a parking facility, even if the vehicle has obstructions, occlusions, or damage to the license plate;
2. mapping the vehicle to a whitelist on entry; and
3. using a secondary mode of authentication to further improve/cross-verify the visual mode of authentication.

There is a need, therefore, for a method and system of vehicle recognition that accomplishes rapid vehicle recognition while addressing the obstacles described above.

SUMMARY OF THE INVENTION

Various embodiments of the method and system of the present invention are described below and shown in the associated Figures. Some embodiments include one or more cameras, each camera either having local processing unit ("LPU") either in the camera itself or having an associated remote LPU to which the camera is communicably connected, such that said LPU may receive and process data captured by the camera unit. In one embodiment, the system may comprise a single camera positioned to view the rear of a vehicle, and configured to perform LPR thereon, and further configured to capture one or more vehicle features from said vehicle. In an alternate embodiment, the system may comprise two cameras, a first camera positioned to view the rear of a vehicle and configured to perform LPR thereon, and/or to capture one or more vehicle features therefrom; and a secondary camera(s) positioned to view the front of the vehicle and configured to perform LPR thereon, and/or to capture one or more vehicle features therefrom. In yet another embodiment, the system may comprise three or more cameras, each of said cameras positioned to view the front, rear, or side(s) of the vehicle, respectively, and configured to perform LPR thereon and/or to capture one or more vehicle features therefrom.

As mentioned previously, visual authentication may be a primary mode of authentication since the vehicle authentication system may be used in both gated and gateless parking facilities. While it can be appreciated by those skilled in the art that a license plate may serve as a key visual authenticator for vehicles, there are plenty of statistical challenges that limit 100% effectiveness of license plate usage for authentication, for example, a vehicle may have broken, damaged, temporary, or stolen license plate(s), or there may be imperfect imaging due to lighting conditions or obstructions (e.g., a bicycle rack, etc.) blocking the license plate(s), to name a few. Hence, various embodiments of the present invention may identify visual features of vehicle itself in addition to or in lieu of the license plate to establish a "vehicle signature" by which the vehicle may be identified/authenticated, or by which the system may corroborate the identification/authentication of a vehicle.

Vehicle information that may be obtained by the camera(s) includes, but is not limited to:
  a. license plate information, which may include but is not limited to:
   i. license plate characters and their order,
   ii. the edit distance between plates,
   iii. character positions within the license plate, and
   iv. the positioning, location, and/or type of defects in or damage to the license plate; and
  b. vehicle features, which may include but are not limited to:
   i. vehicle height,
   ii. vehicle width,
   iii. vehicle length,
   iv. vehicle make,
   v. vehicle model,
   vi. vehicle color,
   vii. the positioning, location, and/or type of damage to the vehicle,
   viii. the presence of lack of window tinting,
   ix. the type of wheels or tires on the vehicle, and
   x. the presence of bumper stickers or decals on the vehicle.

It should be noted that, in certain circumstances, even the use of a vehicle signature may be prone to errors, especially amongst vehicles having similar visual features and no other salient features. In another embodiment of this invention, the search space to match or authenticate vehicles may be reduced utilizing other information identified about the vehicle such as portions of the license plate, car make, car model, color, etc. This information can be saved in the local database, and based on the output of the vehicle detection, utilized to reduce possible signature matches. For example, in one embodiment, location information (e.g., GPS) may be used to time-wise restrict the list of vehicles that may have entered or exited a parking facility. While LPR is often achieved using OCR, embodiments of a system for vehicle authentication may use other license plate information, for example the edit distance between plates, or a signature of character positions within the license plate, to create a unique license plate sub-signature to authenticate, or corroborate the authentication of, a vehicle.

Finally, certain embodiments of the system for vehicle authentication may provide an effective method for onboarding the details of whitelisted vehicles automatically, thereby avoiding the need to have onboarding done through user involvement, or auto-onboarding users using a semi-automated approach.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF THE INVENTION

Embodiments of a system for vehicle authentication, as taught and described herein, relate generally to vehicle identification and authentication for use in parking facilities. The configuration and use of presently preferred embodiments of a system for vehicle authentication are discussed in detail below. It should be appreciated, however, that the present invention provides many applicable inventive concepts that can be embodied in a wide variety of contexts other than parking facility management. Accordingly, the specific embodiments discussed are merely illustrative of specific ways to make and use the invention, and do not limit the scope of the invention.

Figure 1:
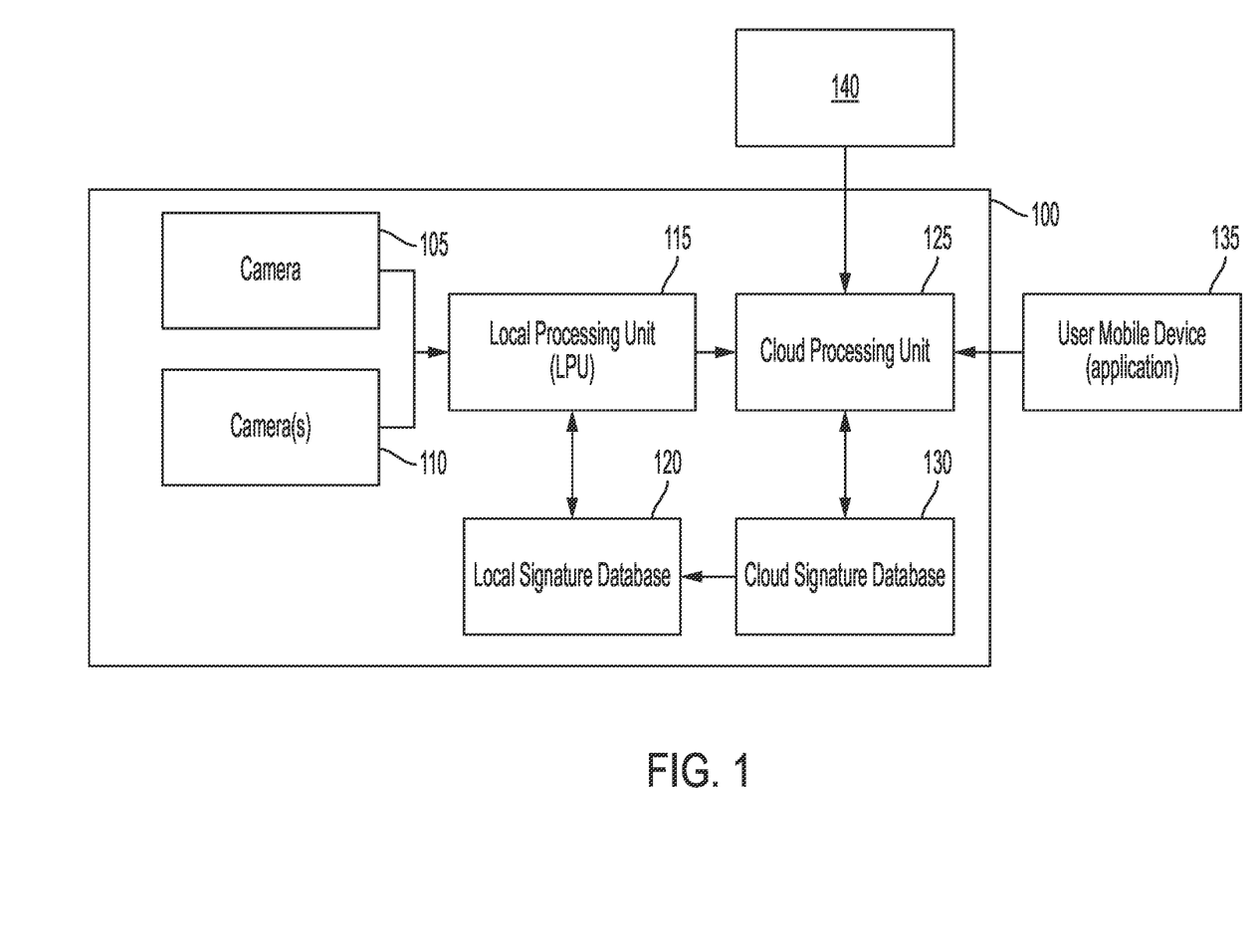
FIG. 1 depicts a high-level system block diagram of an exemplary embodiment of a system for vehicle authentication.

FIG. 1 depicts a high-level system block diagram of an exemplary embodiment of a system for vehicle authentication, namely system 100. System 100 comprises camera 105, LPU 115, local signature database 120, cloud processing unit 125, and cloud signature database 130.

Camera 105 is communicably connected to LPU 115, which is in turn communicably connected to both local signature database 120 and cloud signature database 130. Cloud signature database 130 is communicably connected to both cloud processing unit 125 and local signature database 120.

Camera 105 may capture vehicle information and pass said vehicle information to LPU 115. Embodiments of the system may additionally comprise one or more additional camera(s) 110 which may also be used to capture vehicle information and pass said vehicle information to LPU 115.

LPU 115 may process the vehicle information received from camera 105, and if applicable camera(s) 110, to establish a vehicle signature, which it may the pass to local signature database 120 and/or cloud processing unit 125. In addition to the vehicle information received from cameras 105 and 110, LPU 115 may obtain and analyze event information related to the vehicle (e.g., timestamps of when the camera(s) captured images of the vehicle, etc.).

Cloud processing unit 125 may receive vehicle signature information from LPU 115 and an indication of whether a vehicle has been matched or not matched with a list of whitelisted vehicles from local signature database 120. If a vehicle is determined to not already be whitelisted, then cloud processing unit 125 may evaluate the vehicle signature and validate it against onboarded signatures form users already present. Cloud processing unit 125 may evaluate and store signatures from user onboarded image(s) that are uploaded by the user via application 135. Cloud processing unit 125 may also obtain user location information from application 135 and may use the user location information to narrow the search parameters when determining whether or not there is a match between the vehicle information and a vehicle signature from cloud signature database 130. Cloud processing unit 125 may also receive user-provided images of a vehicle and other information from application 135 and use those user-provided images and information for validation and user onboarding. The vehicle signatures for newly onboarded users may be sent to cloud signature database 130.

Cloud signature database 130 may receive and store vehicle signatures from cloud processing unit 125 and may send vehicle signatures to cloud processing unit 125 for comparison against vehicle features captured by camera 105, and if applicable camera(s) 110, and/or from vehicle signatures derived therefrom received from LPU 115. Cloud signature database 130 and local signature database 120 may transfer vehicle signatures and information related thereto between one another. Cloud signature database 130 may be used to aggregate vehicle signatures across all parking facilities.

Local signature database 120 may be located and configured to maintain local copies of all the vehicle signatures for whitelisted vehicles for the specific parking facility at which local signature database 120 is located. Local signature database 120 may provide vehicle signatures to LPU 115 so that LPU 115 may compare vehicle information captured from camera 105, and if applicable camera(s) 110, against vehicle signatures known to the system. Additionally, local signature database 120 may transfer vehicle signatures and associated information to and from cloud signature database 130 as needed by the system.

Figure 2:
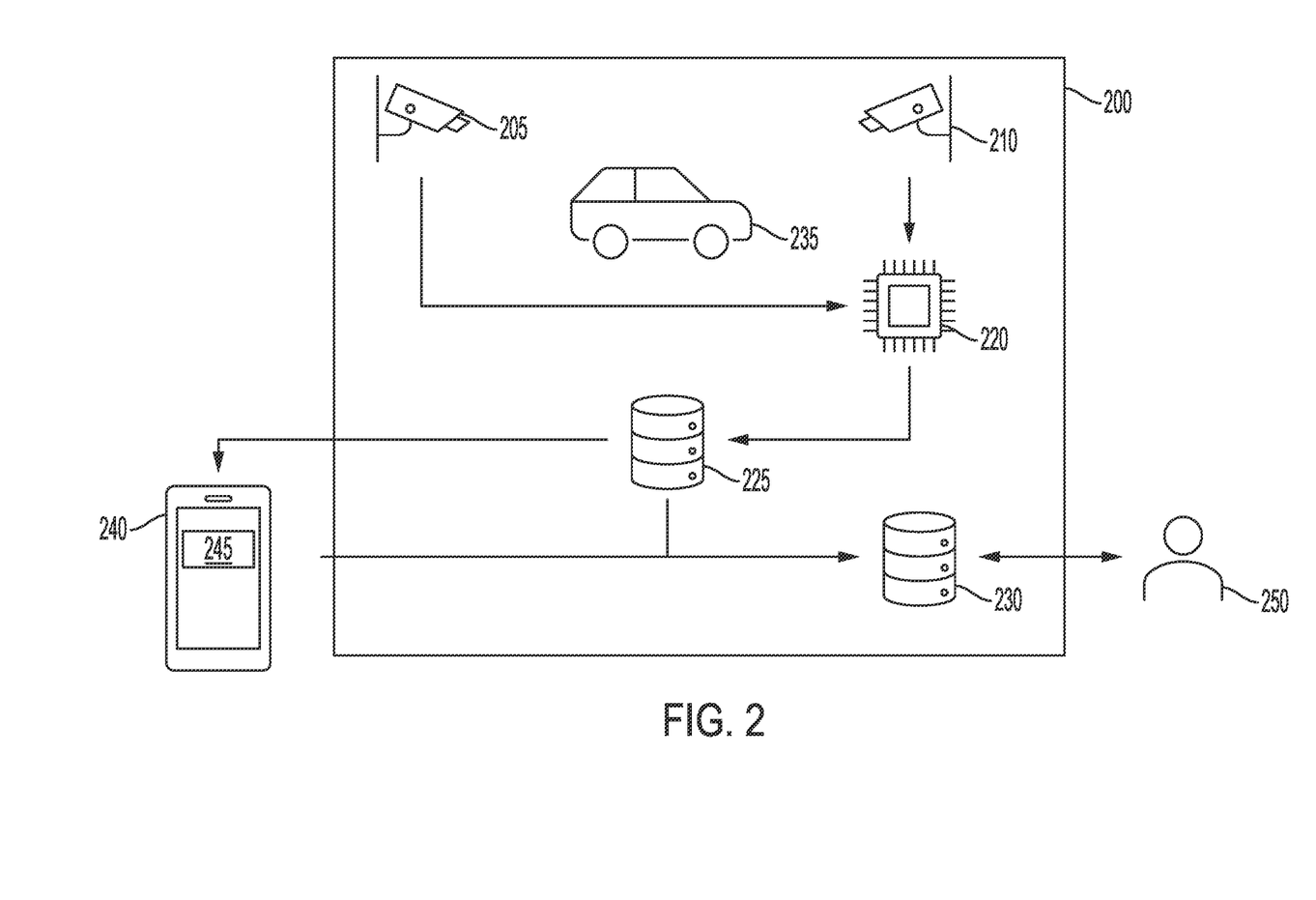
FIG. 2 depicts a schematic diagram of an exemplary embodiment of a system for vehicle authentication.

FIG. 2 shows a schematic diagram of an exemplary embodiment of a system for authentication of a vehicle, system 200, comprising first camera 205, secondary camera(s) 210, processing unit 220 communicably connected to first camera 205 and secondary camera(s) 210, signature database 225 communicably connected to processing unit 220 user device 240 and parking facility occupancy reconciliation ledger 230 containing garage occupancy and reconciliation information. FIG. 2 further depicts local signature database 225 and parking facility occupancy reconciliation ledger 230 as being communicably connected to a user mobile device 240 running application 245. System operator 250 may be able to access parking facility occupancy reconciliation ledger 230 for manual review.

In the embodiment depicted in FIG. 2, first camera 205 may be positioned to view the rear of vehicle 235 and may be configured to capture license plate information and/or vehicle feature(s) from vehicle 235 while vehicle 235 is within a field of view of first camera 205. Similarly, secondary camera(s) 210 may be positioned to view a front (or a side) of vehicle 235 and may be configured to capture license plate information and/or vehicle feature(s) from vehicle 235 while vehicle 235 is within the field of view of secondary camera(s) 210. First camera 205 and secondary camera(s) 210 may transmit the vehicle information (i.e., license plate information and/or vehicle feature(s)) captured from vehicle 235 to processing unit 220. This transfer of vehicle information from first camera 205 and secondary camera(s) 210 to processing unit 220 may be via suitable network connections therebetween. processing unit 220 may be configured to process the vehicle information (e.g., vehicle feature(s), LPR information, and license plate sub-signature) received from first camera 205 and secondary camera(s) 210 to develop a vehicle signature for vehicle 235. processing unit 220 may be further configured to transmit the vehicle signature for vehicle 235 to database 225 via a suitable network connection. Database 225 may be configured to receive the vehicle signature for vehicle 235 transmitted from processing unit 220. processing unit 220 and/or database 225 may be configured to compare vehicle signature for vehicle 235 against an index of known vehicle signatures stored in database 225.

If it is determined that the vehicle signature received from processing unit 220 matches a known vehicle signature contained in the index of known vehicle signatures stored in database 225, the system will send the correct license plate that is paired with the indexed signature to both the local database and cloud database. If it is determined that the vehicle signature received from processing unit 220 does not match a known vehicle signature contained in the index of known vehicle signatures stored in database 225, the license plate predicted by the OCR engine will be sent to the local and cloud database.

In embodiments, the index of known vehicle signatures stored in database 225 may include designations indicating that a vehicle associated with a given vehicle signature are on a whitelist for the parking facility associated with system 200. In such embodiments, database 225 may identify whether or not the indexed known vehicle signature matching the vehicle signature for vehicle 235, contained in database 225 identifies includes a whitelist designation. If the whitelist designation is found in the index of known vehicle signatures that matches the vehicle signature for vehicle 235 the system will send the correct license plate that is paired with the indexed signature to both the local database and cloud database. If the whitelist designation is not found in the index of known vehicle signatures that matches the vehicle signature for vehicle 235 the vehicle 235 will be treated as a transient parker, or a none whitelist vehicle, which means the prediction made by the OCR engine will be sent to the local and cloud database.

Database 225 may be communicably connected to user mobile device 240 via a suitable wireless network. Database 225 may be configured to send a user notification to application 245 running on user mobile device 240. The first camera 205 may be positioned and optimized for accurate license plate reading from vehicle 235 when vehicle 235 is entering and/or exiting a parking facility. The secondary camera(s) 210 may be positioned for optimal viewing of vehicle features to assist first camera 205 in gathering information suitable to generate the vehicle signature.

In certain embodiments, first camera 205 and secondary camera(s) 210 may be placed in a manner to best to maintain scalable cost depending on the operating environment. For example, in one embodiment, the first camera 205 may be setup to do both LPR and to obtain vehicle features and other information that may be compiled into a vehicle signature, avoiding the need for secondary camera(s) 210. In another embodiment, the first camera 205 may be optimized for license plate reading, while the secondary camera(s) 210 may be optimized for extracting vehicle features for the vehicle signature. In yet another embodiment, first camera 205 may be positioned and configured to on LPR and one or more secondary camera(s) 210 may be positioned and configured, for example, to look at the front and rear of the vehicle 235, respectively to focus on extraction of vehicle features for generating the vehicle signature.

There is a benefit to keeping the placement of the first camera 205 and secondary camera(s) 210 flexible to address various environmental conditions. While it is desired that the first camera 205 and secondary camera(s) 210 are positioned to view opposite sides of vehicle 235, physical constraints may dictate that they view the same side of vehicle 235.

Processing unit 220 may be configured to generate a vehicle signature for vehicle 235 from the images captured by first camera 205 and/or secondary camera(s) 210. To achieve this, processing unit 220 may be configured to perform LPR among other tasks. Processing unit 220 is typically located in the parking facility and is hence set up to reduce the delay between the entry/exit of a vehicle and physical action to be performed on site (e.g., opening of boom barrier). Processing unit 220 may be configured to transmit event information, which may include, but is not limited to, images from the first camera 205 and secondary camera(s) 210, license plate recognition, timestamps, and an indication of match/mismatch with a list of whitelisted vehicles in a database 225 to parking facility occupancy reconciliation ledger 230.

In the event that processing unit 220 determines that vehicle 235 is not whitelisted, the system may evaluate the vehicle signature and validate it against onboarded signatures stored in parking facility occupancy reconciliation ledger 230 from users if already present in the parking facility.

Application 245 may be executed on a user device 240. Application 245 may be used to capture vehicle and/or location information, including but not limited to vehicle images from the user and sends these to cloud for validation and user onboarding. After user onboarding, at least one signature for the given user/vehicle may be made available in the database 225. Additionally, other user location information may be captured via application 245 from any mobile device that supports obtaining and sharing location information using one or more modalities, such as location or position information which may be obtained via GPS, WiFi, Bluetooth, etc.

Figure 3:
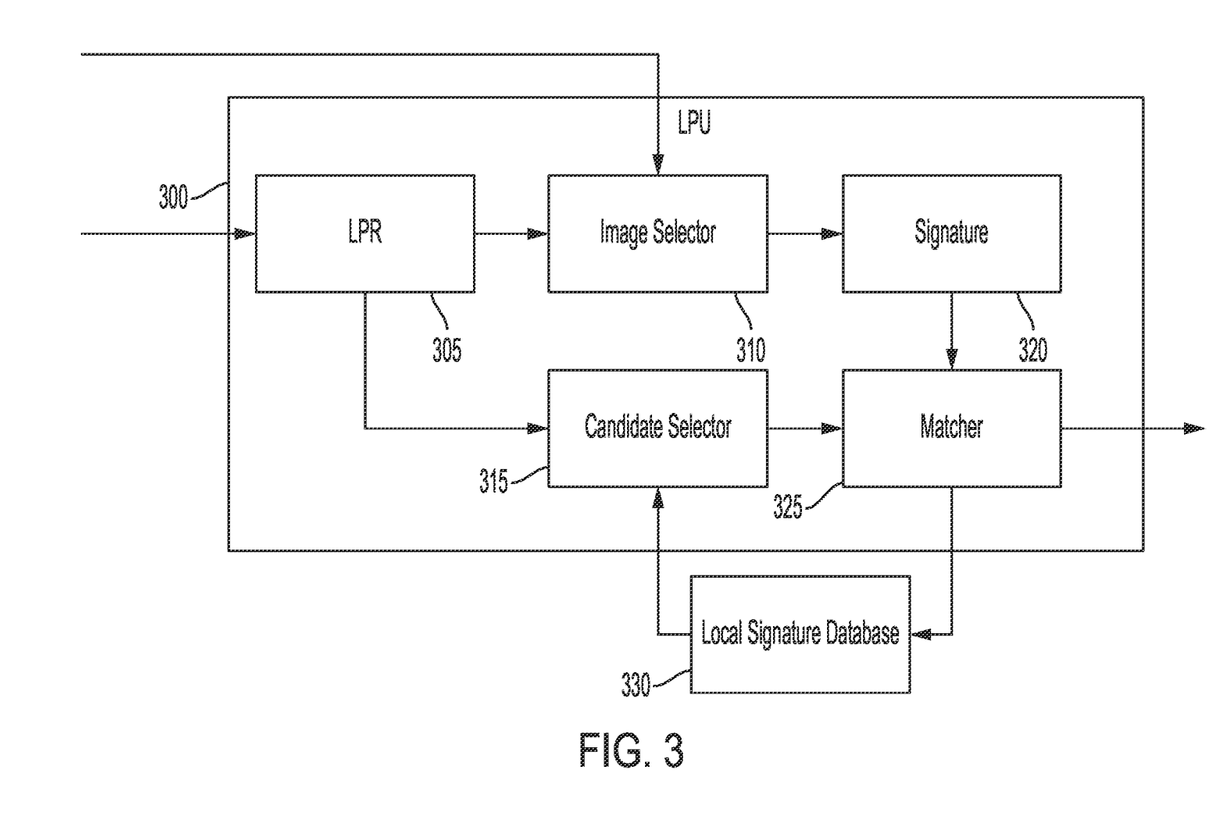
FIG. 3 depicts a high-level system block diagram of a local processing unit, in accordance with embodiments.

FIG. 3 shows a high-level system block diagram of an exemplary embodiment of a LPU, such as LPU 115, or processing unit 220. LPU 300 may comprise LPR module 305, image selector module 310, candidate selector module 315, signature module 320, and matcher module 325. LPR module 305 may receive vehicle information from one or more cameras. LPR module 305 may receive vehicle information from one or more cameras, process the vehicle information in order to determine license plate information such as a license plate number and/or a license plate sub-signature, and send images of the vehicle to image selector module 310 and/or the license plate information to candidate selector module 315. Image selector module 310 may receive vehicle information from LPR module 305 and may also be configured to receive vehicle information directly from one or more cameras. Image selector module 310 may receive vehicle information from LPR module 305, analyze the images from the one or more cameras to determine the one or more best images for vehicle signature evaluation, and send the selected image(s) to signature module 320. Signature module 320 may receive the image(s) selected by image selector module 310, evaluate the selected image(s) in order to determine a vehicle signature therefrom, and send the vehicle signature to matcher module 325. Candidate selector module 315 may receive license plate information from LPR module 305 and known vehicle signature information from signature database 330, which may be a local signature database, compare the license plate information against the known vehicle signatures to reduce the list of potential vehicle signature candidates against which matcher module 325 will have to compare the vehicle information, and send the list of potentially matching known vehicle signatures to matcher module 325. Matcher module 325 may receive the vehicle signature developed from the vehicle information from signature module 320 and the list of potentially matching known vehicle signatures from candidate selector module 315, compare the vehicle signature against the list of potentially matching known vehicle signatures to make a match/no match determination. If matcher module 325 determines there to be a match between the vehicle signature and one of the known vehicle signatures it may send the vehicle information to a kiosk located at the parking facility for the driver of the vehicle to confirm or dispute the identification of the vehicle by the system. If matcher module 325 determines there to be no match between the vehicle signature and one of the known vehicle signatures, the system may identify the vehicle as a transient parker and may send the new vehicle signature to signature database 330 to be stored therein and may send the vehicle information to a cloud processing unit for additional processing.

In embodiments, if the system determines there to be no match between the vehicle signature and a known vehicle signature from the local signature database 330, the system may re-evaluate the captured images at a cloud processing unit, which will be discussed in detail in reference to FIG. 4.

Figure 4:
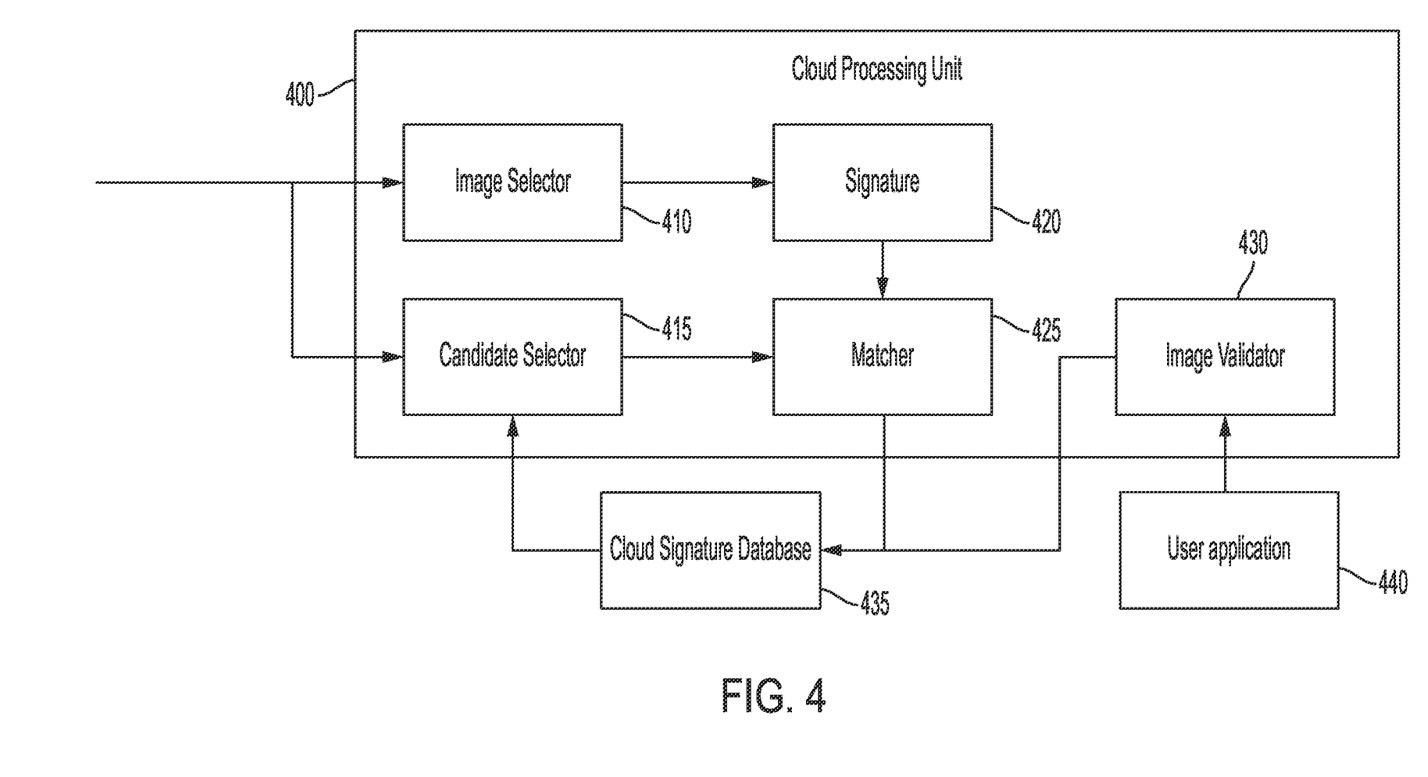
FIG. 4 depicts a high-level system block diagram of a cloud processing unit, in accordance with embodiments.

FIG. 4 depicts a high-level system block diagram of an exemplary embodiment of a cloud processing unit 400, like cloud processing unit 125. Cloud processing unit 400 may comprise image selector module 410, candidate selector module 415, signature module 420, matcher module 425, and image validator module 430. The image selector module 410, signature module 420, candidate selector module 415, and matcher module 425 may be functionally similar to image selector module 310, signature module 320, candidate selector module 315, and matcher module 325 described previously in reference to LPU 200 in FIG. 3, however they operate with an additional input of location information, which may be received from user application 440 wherever available, to help reduce the search space of potential matching known vehicle signature candidates, and may draw on additional known vehicle signatures which may be stored in signature database 435, which may be a cloud signature database, and which may have more known vehicle signatures stored therein than a local signature database.

If an LPU, such as LPU 300, fails to determine a match between the vehicle information and a known vehicle signature it may pass the vehicle information to a cloud processing unit, such as cloud processing unit 400, in which case image selector module 410 may receive vehicle information from the LPU, analyze the images from the one or more cameras to determine the one or more best images for vehicle signature evaluation, and send the selected image(s) to signature module 420. Signature module 420 may re receive the image(s) selected by image selector module 410, evaluate the selected image(s) in order to determine a vehicle signature therefrom, and send the vehicle signature to matcher module 425. Candidate selector module 415 may receive license plate information from the LPR and known vehicle signature information from signature database 435, which may be a cloud signature database, compare the license plate information against the known vehicle signatures to reduce the list of potential vehicle signature candidates against which matcher module 425 will have to compare the vehicle information, and send the list of potentially matching known vehicle signatures to matcher module 425. Matcher may receive the vehicle signature developed from the vehicle information from signature module 420 and the list of potentially matching known vehicle signatures from candidate selector module 415, compare the vehicle signature against the list of potentially matching known vehicle signatures to make a match/no match determination. If matcher module 425 determines there to be a match between the vehicle signature and one of the known vehicle signatures it may send the vehicle information to a kiosk located at the parking facility for the driver of the vehicle to confirm or dispute the identification of the vehicle by the system. If matcher module 425 determines there to be no match between the vehicle signature and one of the known vehicle signatures, it may send the new vehicle signature to signature database 435 to be stored therein and may send the vehicle signature information to a garage occupancy reconciliation ledger so that the parking facility can actively monitor its ingress/egress of the parking facility despite not being in the system previously.

Image validator module 430 may receive vehicle information, such as in the form of images of a vehicle, from user application 440, which may be running on a user device, and run LPR and vehicle signature generation on from said vehicle information, and send the vehicle signature generated by the image validator module 430 to cloud signature database 435. In embodiments image validator module 430 may comprise a computer vision model such as that in an LPU or cloud processing unit but may be more robust system than the other two.

A cloud processing unit, such as cloud processing unit 400, may be used when an LPU either does not exist or exists but fails to make a match determination. In the event that no LPU exists, the cloud processing unit may receive the vehicle information directly from the one or more cameras rather than via the LPU as described above.

The components of a cloud processing unit, such as cloud processing unit 400, may deploy a more generalized version of signature evaluation than the related components of the LPU 300 to support a larger variety of image quality, as well as to take into account information provided by user application 440, which may include, but is not limited to, location information, vehicle images, and vehicle information uploaded by a user through application 440.

Having matched with a whitelisted user, using the user onboarded image, the updated vehicle signature may be updated to the cloud signature database 435. In embodiments, a local signature database may be configured to query the cloud signature database for any updates to vehicle signatures or whitelists.

In embodiments, if the system determines there to be no match between the vehicle signature and a known vehicle signature from one or both of a local signature database and the cloud signature database 435, the system may identify the vehicle as that of a transient parker. In such an event, the system may save the vehicle signature to one of the signature databases, and may record the vehicle in a parking facility reconciliation ledger, such as parking facility occupancy reconciliation ledger 230.

Figure 5:
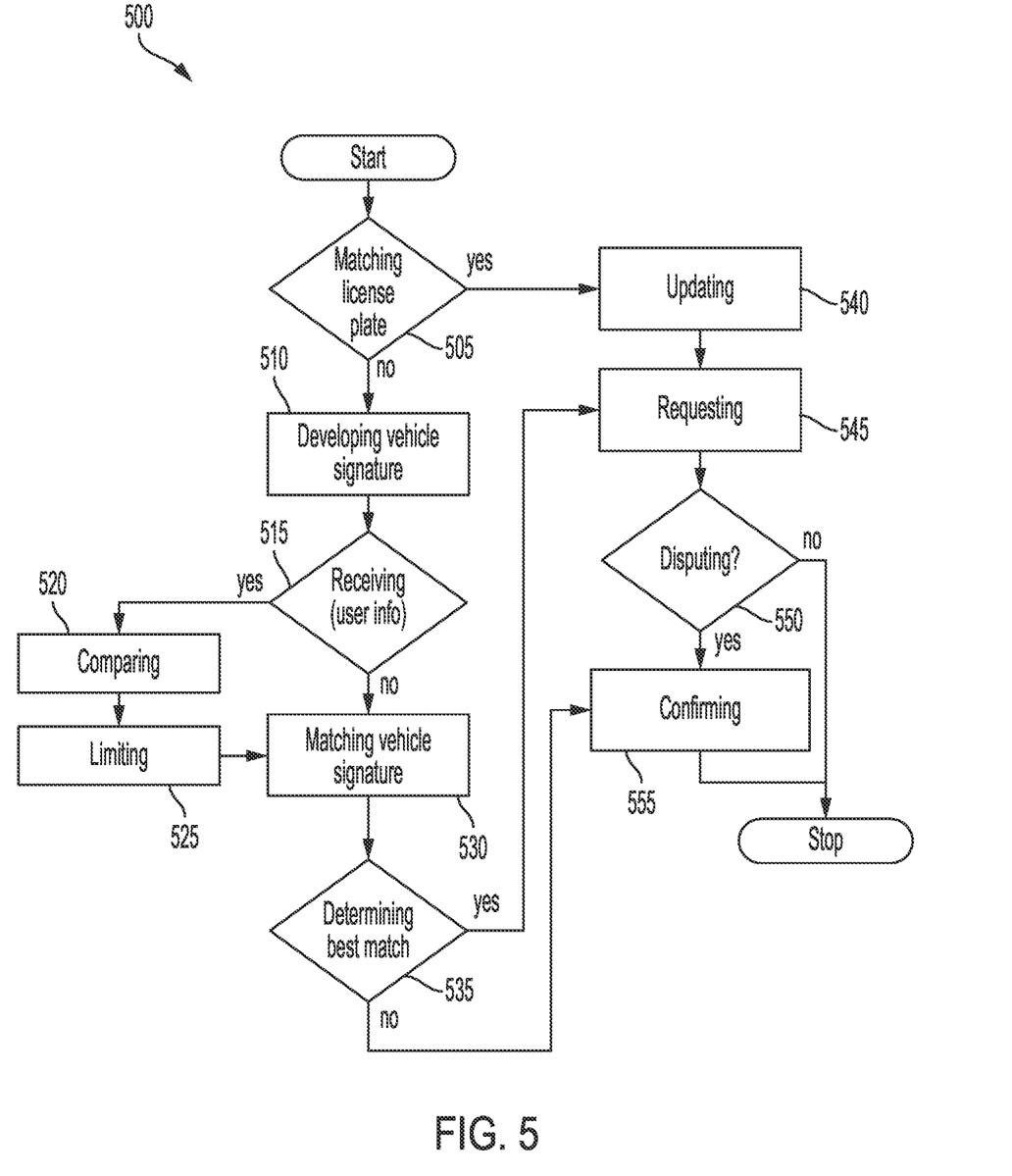
FIG. 5 depicts a flowchart of an exemplary embodiment of a method for authentication of a vehicle entering a gateless parking facility.

FIG. 5 depicts a flowchart of an exemplary embodiment of a method for authentication of a vehicle entering a gateless parking facility, namely method 500. Method 500 comprises the steps of matching 505 license plate information, updating 540 an account associated with a matched license plate, developing 520 a vehicle signature, receiving 515 user information, comparing 520 the user information against event information, limiting 525 the pool of possible known vehicle signature matches, matching 530 the developed vehicle signature against possible known vehicle signatures, determining 535 a best match out of the matching known vehicle signatures, requesting 545 confirmation of the system's identification of the vehicles in question, disputing 550 the vehicle's identification, and confirming the vehicle's identification.

The step of matching 505 may comprise receiving an image of a vehicle, performing LPR on the image of the vehicle and comparing the license plate information from the vehicle against known license plate information from known vehicles, stored in a database. If there is a match between the license plate information of the vehicle and the known license plate information from the database the method may skip to the step of updating 540, wherein the account associated with the license plate that matches the license plate of the subject vehicle may be updated to better match the subject vehicle at present, after which method 500 may proceed to the step of sending 545 which will be described in additional detail below.

If there is no match found at step 505, method 500 may proceed to the step of developing 510 a vehicle signature for the vehicle in question. The vehicle signature developed at step 510 may comprise one or more of a license plate signature, a license plate sub-signature, and vehicle features.

Once a vehicle signature has been developed for the subject vehicle at step 510, method 500 may proceed to the step of receiving 515, wherein the system may or may not receive user information, such as but not limited to location information, from an application running on a user device associated with the vehicle in question. If the system receives user information, such as location information, from the user, method 500 may proceed to the step of comparing 5520 the user provided information against event information obtained from the system and may use the comparison of the user information against the event information in step 520 to perform the step of limiting 525 the possible known vehicle signatures against which the developed vehicle signature must be compared in the step of matching 530.

In the step of matching 530, the system may perform a matching between the vehicle signature for the subject vehicle developed in step 510 against a plurality of known vehicle signatures stored in one or more signature databases. The step of matching 530 may result in a plurality of possible known vehicle signature matches being returned, which may be ranked based on the closeness of the match between each of the possible known vehicle signatures and the vehicle signature developed for the subject vehicle at step 510.

At the step of determining 535, the system may compare the possible known vehicle signature matches identified in step 530 and the developed vehicle signature in order to identify a single known vehicle signature that is a best match for the developed vehicle signature. Such a determining 535 may be based on a percentage match between the known vehicle signature and the developed vehicle signature or by some other suitable weighting criteria or other mechanic.

If a best match is determined at step 535, such as by the percentage match being above a predetermined threshold, or some other suitable mechanic, method 500 may proceed to the step of requesting 545, wherein the system may send a notification to a kiosk located at the parking facility where the triggering event took place, and/or to an application on the user device associated with the best matched known vehicles signature, requesting that confirmation or rejection the system's identification of the vehicle. The step of requesting 545 may also comprise sending vehicle ingress/egress confirmation to a parking facility occupancy reconciliation ledger so that the parking facility may track what vehicles are present in the parking facility at any given time. If the driver of the subject vehicle and/or owner of the user mobile device associated with the best-matched known vehicle signature does not dispute the identification of their vehicle, then the system may determine that it has properly identified and authenticated the subject vehicle and method 500 may end. If the driver of the subject vehicle and/or the owner of the user mobile device associated with the best-matched known vehicle signature disputes the identification of their vehicle at step 545, it may trigger the step of confirming 550 the identification of the subject vehicle, which may be done manually by an operator of the parking facility.

In embodiments, the step of sending 540 may also comprise sending vehicle ingress/egress confirmation to a parking facility occupancy reconciliation ledger so that the parking facility may track what vehicles are present in the parking facility at any given time.

While the present system and method has been disclosed according to the preferred embodiment of the invention, those of ordinary skill in the art will understand that other embodiments have also been enabled. Even though the foregoing discussion has focused on particular embodiments, it is understood that other configurations are contemplated. In particular, even though the expressions "in one embodiment" or "in another embodiment" are used herein, these phrases are meant to generally reference embodiment possibilities and are not intended to limit the invention to those particular embodiment configurations. These terms may reference the same or different embodiments, and unless indicated otherwise, are combinable into aggregate embodiments. The terms "a", "an" and "the" mean "one or more" unless expressly specified otherwise. The term "connected" means "communicatively connected" unless otherwise defined.

When a single embodiment is described herein, it will be readily apparent that more than one embodiment may be used in place of a single embodiment. Similarly, where more than one embodiment is described herein, it will be readily apparent that a single embodiment may be substituted for that one device.

Any process descriptions or blocks in flow charts should be understood as representing modules, segments, portions of code, or steps that include one or more instructions for implementing specific logical functions in the process, and alternate implementations are included within the scope of the present invention in which functions may be executed out of order from that shown or discussed, including Substantially concurrently in reverse order, depending on the functionality involved, as would be understood by those reasonably skilled in the art of the present invention.

In light of the wide variety of methods for parking management known in the art, the detailed embodiments are intended to be illustrative only and should not be taken as limiting the scope of the invention. Rather, what is claimed as the invention is all such modifications as may come within the spirit and scope of the following claims and equivalents thereto.

None of the description in this specification should be read as implying that any particular element, step or function is an essential element which must be included in the claim scope. The scope of the patented subject matter is defined only by the allowed claims and their equivalents. Unless explicitly recited, other aspects of the present invention as described in this specification do not limit the scope of the claims.

To aid the Patent Office and any readers of any patent issued on this application in interpreting the claims appended hereto, the applicant wishes to note that it does not intend any of the appended claims or claim elements to invoke 35 U.S.C. 112(f) unless the words "means for" or "step for" are explicitly used in the particular claim.

We claim:

1. A system for vehicle authentication comprising:
a processing unit communicably connected to a camera and a database,
wherein the camera is configured to obtain an image comprising vehicle information comprising license plate information and a vehicle feature from a vehicle as it enters and/or exits a parking facility and send the vehicle information to the processing unit, wherein the database comprises a plurality of vehicle signatures and is configured to provide the processing unit with access to the vehicle signatures, and
wherein the processing unit is configured to receive the vehicle information from the camera and to establish a vehicle signature based on an analysis of the image, to identify candidate vehicle signatures by comparing the vehicle information against the vehicle signatures, and to make a match or no-match determination between the vehicle information and the candidate vehicle signatures.

2. The system for vehicle authentication of claim 1, wherein the processing unit is a local processing unit.

3. The system for vehicle authentication of claim 1, wherein the processing unit is a cloud processing unit.

4. The system for vehicle authentication of claim 1, further comprising:
a cloud processing unit and a cloud database;
wherein the cloud processing unit is configured to receive the vehicle information if the processing unit is unable to determine a match between the vehicle information and a vehicle signature from the database, to compare the vehicle information against additional vehicle signatures from the cloud database, and to determine if the vehicle information matches one of the additional vehicle signatures.

5. The system for vehicle authentication of claim 1, wherein the database is a local database.

6. The system for vehicle authentication of claim 1, wherein the database is a cloud database.

7. The system for vehicle authentication of claim 1, wherein the license plate information comprises at least one of the group consisting of:
license plate characters;
an order of the license plate characters;
an edit distance between license plates;
character positions within a license plate;
and defects in the license plate; and
damage to the license plate; and
the vehicle feature comprises at least one of the group consisting of:
a vehicle height;
a vehicle width;
a vehicle length;
a vehicle make;
a vehicle model;
a vehicle color;
a location of damage to the vehicle;
a type of damage to the vehicle;
a presence of lack of window tinting;
a type of wheel on the vehicle;
a presence or lack of decals on the vehicle; and
a position of the decals.

8. The system for vehicle authentication of claim 1, further comprising: at least one additional camera positioned to have a different view of the vehicle than that of the camera and configured to obtain additional vehicle information from the vehicle as it enters and/or exits a parking facility and send the additional vehicle information to the processing unit.

9. The system for vehicle authentication of claim 1, wherein the database further comprises a whitelist of vehicle signatures.

10. The system for vehicle authentication of claim 1, wherein the processing unit comprises:
a license plate recognition module configured to receive the vehicle information from the camera and extract license plate information therefrom;
an image selector module configured to receive images of the vehicle from the camera and to determine at least one selected image, wherein the at least one selected image comprises identified vehicle features;
a candidate selector module configured to compare license plate information from the license plate recognition module against vehicle signatures from the database, and to identify candidate vehicle signatures with which the vehicle information may be closely matched;
a signature module configured to receive the at least one selected image and to establish a vehicle signature based on an analysis of the at least one selected image; and
a matcher module configured to receive the vehicle signature from the signature module and the candidate vehicle signatures from the candidate selector module, and to make a match or no-match determination between the vehicle information and the candidate vehicle signatures.

11. The system for vehicle authentication of claim 1 further comprising:
an image validator module and an application configured to run on a user device;
wherein the application is configured to receive user input and to transmit user information to the processing unit; and
wherein the image validator module is configured to receive user information from the application and to perform license plate recognition thereon and to generate a vehicle signature therefrom.

12. A method for authentication of a vehicle comprising the steps of:

capturing a plurality of images of a vehicle as it enters/ exits a parking facility via a camera;
capturing event information contemporaneously with the capturing of the images;
sending the images and the event information to a processing unit;
receiving location information from a user device at the processing unit;
performing license plate recognition on the images at a license plate recognition module;
comparing license plate information against a plurality of known vehicle signatures stored in a signature database at a candidate selector module;
selecting at least one candidate known vehicle signature based on said comparing;
removing a known vehicle signature from the at least one candidate known vehicle signature responsive to a comparison of the event information and the location information;
selecting at least one preferred image from the plurality of images via an image selector module;
establishing a vehicle signature comprising a vehicle feature for the vehicle based on an analysis of the at least one preferred image at the signature module;
comparing the vehicle signature against the at least one candidate known vehicle signature at a matcher module;
determining a match or no-match status between the vehicle signature and the at least one candidate known vehicle signature; and
determining a whitelist status for the vehicle responsive to a match determination.

* * * * *